(12) United States Patent
Wolfschoon-Pombo et al.

(10) Patent No.: US 8,349,379 B2
(45) Date of Patent: Jan. 8, 2013

(54) CREAM CHEESE PRODUCT AND ITS METHOD OF PREPARATION

(75) Inventors: Alan Wolfschoon-Pombo, Freising (DE); Mehran Rose, Hohenbrunn (DE); Peter Habermeier, Scheyem (DE); Dirk Muxfeldt, Obermeitingen (DE); Hermann Eibel, Freising (DE)

(73) Assignee: Kraft Foods R & D, Inc., Glenview, IL (US)

( * ) Notice: Subject to any disclaimer, the term of this patent is extended or adjusted under 35 U.S.C. 154(b) by 866 days.

(21) Appl. No.: 11/719,571

(22) PCT Filed: Nov. 21, 2005

(86) PCT No.: PCT/US2005/042180
§ 371 (c)(1), (2), (4) Date: Jan. 9, 2009

(87) PCT Pub. No.: WO2006/057968
PCT Pub. Date: Jun. 1, 2006

(65) Prior Publication Data
US 2009/0123601 A1 May 14, 2009

(30) Foreign Application Priority Data
Nov. 25, 2004 (EP) ..................... 04027965

(51) Int. Cl.
*A23C 9/12* (2006.01)

(52) U.S. Cl. ............... 426/36; 426/34; 426/39; 426/582

(58) Field of Classification Search ............ 426/34, 426/36, 38, 39, 40, 41, 519, 580, 582
See application file for complete search history.

(56) References Cited

U.S. PATENT DOCUMENTS

| | | | |
|---|---|---|---|
| 4,552,774 A | 11/1985 | Gronfor | |
| 5,714,182 A | 2/1998 | Bisson et al. | |
| 6,419,975 B1 | 7/2002 | Han et al. | |

FOREIGN PATENT DOCUMENTS

| | | |
|---|---|---|
| CA | 2 139 925 C | 12/1998 |
| EP | 1 020120 A2 | 7/2000 |
| EP | 1 214 884 A2 | 6/2002 |
| JP | H08-501683 A | 2/1996 |
| JP | 2002-186423 A | 7/2002 |

OTHER PUBLICATIONS

C. Sanchez, J.-L. Beauregard, J.-J. Bimbenet, and J. Hardy, Flow Properties, Firmness and Stability of Double Cream Cheese Containing Whey Protein Concentrate, Journal of Food Science, vol. 61, Issue 4, 1996, pp. 840-843 and 846.

*Primary Examiner* — Leslie Wong
(74) *Attorney, Agent, or Firm* — Fitch, Even, Tabin & Flannery, LLP

(57) ABSTRACT

The invention relates to a cream cheese product obtainable by a process comprising the steps of: (a) acidifying a whey protein concentrate with a food grade acidulant or with starter bacteria to reduce the pH to more than 4.5 to about 5.2, (b) heating the acidified whey protein concentrate of step (a) slowly to a temperature of about 75° to about 90° C. and maintaining it for at least about 30 min to produce a 1.5 functional whey protein concentrate, (c) optionally blending the whey protein concentrate of step (b) with milk fat in a weight ratio of about 60:40 to about 100:0 wherein step (c) may be carried out before step (b), (d) homogenizing the blend obtained in step (b) or (c) in a 2-stage high-pressure homogenizer at pressures of about 300-400/50-80 bar and a temperature of about 5° to about 75° C. to produce an emulsified functional whey protein concentrate, (e) blending the product of step (d) with curd the fat content of which is adjusted in accordance with the milk fat portion added in step (c) and with the desired product, and adding salt and optional stabilizers, and (f) homogenizing the product of step (e) in a 2-stage high pressure homogenizer at pressures of about 300-400/508-80 bar and at a temperature of about 68° to about 90° C.

6 Claims, No Drawings

CREAM CHEESE PRODUCT AND ITS METHOD OF PREPARATION

This application is a 371 of PCT/US2005/042180 filed Nov. 21, 2005.

FIELD OF THE INVENTION

The present invention relates to a novel cream cheese product having an enhanced creamy texture and mouthfeel and a process for producing same.

BACKGROUND OF THE INVENTION

Whey (acid, sweet or mixtures thereof) is obtained as a by-product from the production of cheese or casein. Whey contains valuable proteins and there have been many attempts to incorporate whey proteins into cheese products. However, whey proteins in their natural form do not have the appropriate and desired physical and chemical properties required for good or high quality cheese products.

A promising approach was the use of functionally enhanced whey proteins for making cheese, including cream cheese. EP-A-1,020,120 describes processes for making a stable cheese product supplemented with functionally enhanced whey proteins. Whey proteins are functionally enhanced by exposing cheese curds or dairy liquids containing whey proteins to controlled heat treatment and/or treatment at high shear rates. However, the processes are limited with respect to achieving low casein:whey proteins ratios, low dry matter contents and high lactose contents, and the texture and mouthfeel of the products are not completely satisfactory.

Further relevant prior art is described in EP-A-1,249,176. It discloses a process for the incorporation of whey proteins into foodstuffs by acidifying an aqueous solution of one or more whey proteins below their isoelectric pH, i.e. 4.5 to 2.5, preferably 4.0 to 3.5, optionally forming a whey protein-stabilized fatty emulsion by blending and homogenizing said acidified solution of whey proteins with one or more fats, heat-treating said acidified solution or whey protein-stabilized fatty emulsion, and blending same with a foodstuff base to form a foodstuff. The two examples relate to the production of processed cheese. Testing out the described process for making cream cheese showed that the taste of obtained cream cheese was too acidic and the addition of neutralizing agents such as NaOH resulted in a cream cheese which had an unacceptable texture.

The object of the present invention is to provide a cream cheese product which has in combination a low casein:whey protein ratio, a low dry matter content, a high lactose content and an enhanced creamy texture and mouthfeel and is reduced syneresis.

SUMMARY OF THE INVENTION

The present invention relates to a cream cheese product obtainable by a process comprising the steps of:
(a) acidifying a whey protein concentrate with a food grade acidulant, preferably citric acid or lactic acid, or with starter bacteria to reduce the pH to more than 4.5 to about 5.2, preferably to about 4.7 to about 4.9,
(b) heating the acidified whey protein concentrate of step (a) slowly, preferably within about 15 to about 120 min, more preferably within about 20 to about 60 min and most preferably within about 25 to about 45 min, to a temperature of about 75 to about 90° C., preferably about 78 to about 85° C., and maintaining it for at least about 30 min, preferably for at least about 45 min, to produce a functional whey protein concentrate,
(c) optionally blending the whey protein concentrate of step (b) with milk fat in a weight ratio of about 60:40 to about 100:0 wherein step (c) may be carried out before step (b),
(d) homogenizing the blend obtained in step (b) or (c) in a 2-stage high-pressure homogenizer at pressures of about 300-400/50-80 bar and a temperature of about 5° to about 75° C., preferably about 15° to about 70° C., to produce an emulsified functional whey protein concentrate,
(e) blending the product of step (d) with curd, the fat content of which is adjusted in accordance with the milk fat portion added in step (c) and with the desired product, and adding salt and optional stabilizers, and
(f) homogenizing the product of step (e) in a 2-stage high-pressure homogenizer at pressures of about 300-400/50-80 bar and at a temperature of about 68° to about 90° C., preferably about 75° to about 85° C.

A preferred cream cheese product is obtainable by the additional step of:
(g) agitating the product of step (f) at a temperature of about 68° to about 90° C., preferably about 75° to about 85° C., for at least about 15 min, preferably at least about 20 min and even more preferably at least about 25 min.

The invention further relates to a process for the manufacture of a cream cheese product comprising the steps of:
(a) acidifying a whey protein concentrate with a food grade acidulant, preferably citric acid or lactic acid, or with starter bacteria to reduce the pH to more than 4.5 to about 5.2, preferably to about 4.7 to about 4.9,
(b) heating the acidified whey protein concentrate of step (a) slowly, preferably within about 15 to about 120 min, more preferably within about 20 to about 60 min and most preferably within about 25 to about 45 min, to a temperature of about 75° to about 90° C., preferably about 78° to about 85° C., and maintaining it for at least about 30 min, preferably for at least about 45 min, to produce a functional whey protein concentrate,
(c) optionally blending the whey protein concentrate of step (b) with milk fat in a weight ratio of about 60:40 to about 100:0 wherein step (c) may be carried out before step (b),
(d) homogenizing the blend obtained in step (b) or (c) in a 2-stage high-pressure homogenizer at pressures of about 300-400/50-80 bar and a temperature of about 5° to about 75° C., preferably about 15° to about 70° C., to produce an emulsified functional whey protein concentrate,
(e) blending the product of step (d) with curd the fat content of which is adjusted in accordance with the milk fat portion added in step (c) and with the desired product and adding salt and optional stabilizers,
(f) homogenizing the product of step (e) in a 2-stage high-pressure homogenizer at pressures of about 300-400/50-80 bar and at a temperature of about 68° to about 90° C., preferably about 75° to about 85° C.

A preferred process comprises the additional step of:
(g) agitating the product of step (f) at a temperature of about 68° to about 90° C., preferably about 75° to about 85° C., for at least about 15 min, preferably at least about 20 min and even more preferably at least about 25 min.

DETAILED DESCRIPTION OF THE INVENTION

One of the important aspects of the present invention is the functionalization of the whey protein concentrate. It was surprisingly found that a cream cheese product with an enhanced creamy texture and mouthfeel can be obtained if the functionalization of the whey protein concentrate is performed in a very specific way which is different from all known prior art processes. It is important to reduce the pH of the whey protein concentrate only to a certain extent so that it is not necessarily below the isoelectric point of all proteins contained in the whey protein concentrate. Furthermore, it is important to slowly heat the acidified whey protein concentrate to a certain temperature and to hold it there for a prolonged time. A cream cheese product with an excellent creamy texture and mouthfeel is obtained if these specific conditions are observed during the protein functionalization.

The process according to the invention will now be described in more detail.

Potential sources of whey proteins to make the modified whey protein concentrate are the proteins found in the sweet and acid whey from cheese manufacturing. Also, a concentrate of any (or a combination of) these two sources obtained by any conventional dehydration method can be used. The whey proteins are normally in a native state but the invention does not exclude utilization of highly denatured whey proteins.

The acidification of the whey protein concentrate (WPC) in step (a) of the process according to the present invention can be done via addition of organic acids—like lactic acid, phosphoric acid, citric acid, etc. or mixtures thereof. This addition—either in a powder (e.g. citric acid) or liquid form (e.g. lactic acid)—can be performed on cold or warm WPC, i.e. over an extended temperature range (between 0° C. and 60° C.). Agitation is necessary to avoid differences in pH across the material.

A biological acidification, using standard dairy starter bacteria (cultures), either in direct-set, lyophilized, frozen or fluid form can also be performed, according to the instructions of the culture manufacturers. The purpose is to reduce the pH to a range of below about 5.2 and more than 4.5 via fermentation of the milk sugar (lactose). The target pH range is preferably between about 4.7 and about 4.9.

The heating step (b) of the acidified WPC obtained in step (a) is carried out slowly, preferably within about 15 to about 120 min, more preferably within about 20 to about 60 min and most preferably within about 25 to about 45 min, to a temperature of about 75 to about 90° C., preferably about 78 to about 85° C., and maintaining it for at least about 30 min, preferably for at least about 45 min, in order to produce a functional whey protein concentrate.

The heating can be carried out in several different ways, with various kinds of equipment. The WPC can be heated in a batch process or in a heat exchanger. The particular apparatus is chosen based on its performance regarding the heat transfer rate, energy consumption, and the extent of fouling (deposit formation) over time.

Usually, when a batch process is chosen, a jacketed tank is fitted with agitators (and blades) which scrape the surface of the tank wall. Through the double jacket, steam or hot water circulate and are followed by cold water. Warming and cooling times are quite long (large tanks) and heat regeneration is not easily possible.

In heat exchangers (flow-through heaters) hot water or condensed steam constitutes the heating medium. Warming and cooling proceed quickly in plate heaters and the energy consumption (heating & cooling) can be small because heat can be recovered. In plate heaters the liquids being heated and cooled are always in counterflow. Because of the turbulent flow, heat transfer is enhanced and fouling diminished. Like a plate heat exchanger, a tubular heat exchanger can be used for heating, holding, cooling and regenerating (regaining of heat and saving of cooling energy).

The acidified and heated WPC solution in the absence of fat is made up of particles whose size d90 (for 90 vol.-% of the particles) is smaller than 95 μm; the median size d50 is lower than 12 μm.

The acidified WPC is optionally blended in step (c) with milk fat. This milk fat can be delivered in the form of cream with different fat content or butter (in different forms, like anhydrous or butter as such). The blending operation is not mandatory, i.e. the acidified WPC can be used directly in step (d). In other words, a fatty emulsion is not mandatory in the present disclosure. Also the WPC can be stored (<10° C.) for several days prior to step (d). The weight ratio of WPC to milk fat is about 60:40 to 100:0. Step (c) can be carried out before step (b).

The homogenization of the WPC in step (d) causes disruption of the WPC aggregates formed during the heating step (b) into smaller ones. The dairy homogenizer consists of a high-pressure positive pump designed to develop pressures up to about 400 bar (40 Mpa). The pressure is generated in a 2-stage process, the first stage pressure being about 300 to about 400 bar and the second stage pressure being about 50 to about 80 bar. Three or more pistons are used to develop such pressures against a homogenizing valve. The WPC solution is forced through this narrow opening (homogenizator valve) where, due to cavitation, particle disruption takes place. The homogenization head usually consists of a two-stage device to develop the pressure. Homogenization is achieved in the first stage; the second stage breaks up the clusters formed immediately after the first stage. The particle (d90) size is smaller than 9 μm and for the median particle size (d50) it is smaller than 4.5 μm after the homogenization step.

The temperature of the WPC in step (d) is between about 5° and about 75° C., preferably about 15° and 70° C.

The purpose of step (d) is to produce a fine-particulated or an emulsified functional whey protein concentrate.

The blending of the functional WPC in step (e) (WPC alone or WPC+milk fat blend) with the other components of the fresh cheese (fat and curd, salt as well as optional stabilizers) is carried out on a weight basis in order to achieve the desired fat level in the end product. Normal dairy equipment for this blending (mixing) operation are blenders, so called Liquiverters, Breddo, etc. A detailed description of mixers and agitators as well as homogenizers and heat transfer equipment can be found in Food Engineering and Dairy Technology, (1981) Verlag A. Kessler, P.O. Box 1721, 85354 Freising, Germany.

The final homogenization in step (f) is carried out in a 2-stage homogenizer capable of achieving pressures in the range of about 300 to about 400 bar (30 to 40 MPa) in the first stage/about 50 to about 80 bar (5 to 8 MPa) in the second stage and with variable Thoma number (basically denotes the relationship of the pressure in the second stage to the first stage, see above textbook, page 125 for detailed explanation). The temperature of the WPC is in the range of is about 68° to about 90° C., preferably about 75° to about 85° C.

The product of step (f) is optionally agitated in an additional process step (g) at a temperature of about 68° to about 90° C., preferably about 75° to about 85° C., for at least about 15 min, preferably at least about 20 min and even more preferably at least about 25 min.

The equipment used for this final agitation step before filling is preferably a reactor tank, as used e.g. in the processed cheese industry to accomplish the so called "creaming" step in processed cheese making. This creaming tank is double-jacketed, with a twin shaft, whereby one of the stirrers scrapes the tank wall. Such heater-mixer tanks are commercially available for example at Karl Schnell (www.karlschnell.de) in Winterbach, Germany.

The invention will now be illustrated by specific examples which describe preferred embodiments of the present invention. They are not intended to limit the scope of the invention.

EXAMPLES

A whey protein concentrate WPC made by blending about 45% sweet and about 35% acid whey with about 20% sweet whey protein concentrate (syrup with about 30% total solids) and by ultrafiltration (via conventional and well-known separation technology and common equipment) of this blend so as to obtain a product having a solids content of about 22 to 23% and a protein content of about 11 to 12% and containing about 8.5% lactose and about 1.6% fat. The mixture was pasteurized at 75° C. for 20 to 30 sec before ultrafiltration. Its temperature was 68° C. to 74° C. after ultrafiltration and then it was cooled down to 4° C. to 8° C. for further storage. The obtained whey protein concentrate is called WPC.

The pH of the WPC was adjusted with about 0.6% (w/w) citric acid 100% (direct addition to WPC at about storage temperature), so as to obtain a pH value of about 4.8. The pH adjustment was carried out in the same tank where the functionalisation was carried out. The temperature of the WPC was raised from storage temperature to about 65° C. via indirect heating (hot water of about 90° C. circulating in the double jacket of the tank), while simultaneously the material was stirred gently with the blades of the stirring tank. Then the water and steam temperature was increased to about 100° C. so as to increase the product temperature to exactly 80° C.±1° C. Agitation was continued without interruptions while the product temperature was kept at 80° C. for 45 min. Then the product was cooled via addition of ice water (1° C.) into the jacket. The WPC was cooled down to <10° C. The obtained functionalized WPC-product—now called FWPC—was used directly for the next step or was kept under storage until the next step.

The next step comprised either
a) preparing a fatty emulsion by blending the FWPC with cream (step (c) of the invention)
or
b) the direct use of the FWPC (obtained in step (b) of the invention)
and
c) homogenizing the FWPC (step (d) of the invention) before addition to the curd.

Specifically, the next steps comprised:
a) an emulsion is prepared by mixing 60% FWPC and 40% cream. The blend is heated (surface scrape heat exchanger, 70° C.) and homogenized (350 bar/70 bar). The obtained product is called FWPC-Mix
or
b) the FWPC is used as such without modification.
and
c) the FWPC is heated via a surface scrape heat exchanger to about 70° C. and then passed through a homogenizer at 350 bar/70 bar.

The FWPC or FWPC-Mix of (a) and (c) or (b) and (c) is blended with curd, stabilizer, salt, etc. in a conventional mixing equipment (Crepaco) and then passed into a product storage tank (conventional equipment) before the material is homogenized at about 350 bar/70 bar at 70° C. in a conventional homogenizer and finally conveyed into the texture buildup reactor. The latter equipment comprises a double-jacketed tank with stirring devices, and with a recirculation loop. In this tank, the whole cheese mass is heated to about 80° C. accompanied by stirring for about 30 min until the filling viscosity is achieved (step (g) of the invention), then the product is filled into tubs in a conventional manner, cooled and stored until distribution.

The viscosity is measured indirectly via probes placed in the recirculation loop; these sensors are able to measure the pressure drop between two points of the tube and are recorded simultaneously. A minimum pressure drop difference (mbar) indirectly corresponds to a viscosity. A commercially available device is used to measure the apparent viscosity of the fluid materials.

The composition of the products of (a) and (c) or (b) and (c) including the compositions of the final cheeses were as follows:
(a) and (c):
the FWPC-Mix was blended in an amount of 30.00% with 68.86% curd and 1.15% salt and gum:

| Composition | Cream | FWPC | Blend | Curd | Cheese |
|---|---|---|---|---|---|
| Total solids | 37.80 | 22.16 | 28.42 | 26.00 | 27.53 |
| Fat | 30.95 | 1.45 | 13.25 | 12.70 | 12.70 |
| Protein | 2.35 | 11.00 | 7.54 | 7.83 | 7.83 |
| Lactose | 3.40 | 7.84 | 6.06 | 3.30 | 4.09 |

(b) and (c)
16.80% FWPC was blended with 82.05% curd and 1.15% salt and gum:

| Composition | FWPC | Curd | Cheese |
|---|---|---|---|
| Total solids | 22.99 | 27.50 | 27.53 |
| Fat | 1.96 | 14.89 | 12.55 |
| Protein | 11.45 | 7.22 | 7.85 |
| Lactose | 8.32 | 3.23 | 4.05 |

The final cheese products were all light cream cheese products having a casein:whey protein ratio of about 60:40.

The invention claimed is:

1. A process for the manufacture of a cream cheese product comprising the steps of:
   (a) acidifying a whey protein concentrate with a food grade acidulant or with starter bacteria to reduce the pH to 4.5 to about 5.2,
   (b) heating the acidified whey protein concentrate of step (a) slowly to a temperature of about 75° to about 90° C. and maintaining it for at least about 30 min. to produce a functional whey protein concentrate,
   (c) homogenizing the blend obtained in step (b) in a 2-stage high-pressure homogenizer at pressures of about 300 to about 400 bar in its first stage and about 50 to about 80 bar in its second stage and a temperature of about 5° to about 75° C. to produce an emulsified functional whey protein concentrate,
   (d) blending the emulsified functional whey protein concentrate of step (c) with curd, the fat content of which is adjusted in accordance with the desired fat content of the cream cheese product, and adding, and
   (e) homogenizing the blend of step (d) in a second 2-stage high-pressure homogenizer at pressures of about 300 to about 400 bar in its first stage and about 50 to about 80 bar in its second stage and at a temperature of about 68° to about 90° C. to form the cream cheese product.

2. The process according to claim 1, further comprising the step of:

(f) agitating the cream cheese product of step (e) at a temperature of about 68° to about 90° C. for at least about 15 min.

3. The process according to claim 1, wherein the food grade acidulant is selected from the group consisting of citric acid and lactic acid, wherein the pH in step (a) is reduced to about 4.7 to about 4.9, wherein the acidified whey protein concentrate of step (a) is slowly heated to the temperature of about 75° to about 90° C. in step (b) within a period of about 15 to about 120 min, wherein the temperature in step (b) is about 78° to about 85° C. and is maintained for at least about 45 min, wherein the temperature in step (c) is about 15° to about 70° C., and wherein the temperature in step (e) is about 750° to about 85° C.

4. The process according to claim 2, wherein the food grade acidulant is selected from the group consisting of citric acid and lactic acid, wherein the pH in step (a) is reduced to about 4.7 to about 4.9, wherein the acidified whey protein concentrate of step (a) is slowly heated to the temperature of about 75° to about 90° C. in step (b) within a period of about 15 to about 120 min, wherein the temperature in step (b) is about 78° to about 85° C. and is maintained for at least about 45 min, wherein the temperature in step (c) is about 15° to about 70° C., wherein the temperature in step (e) is about 75° to about 85° C., and wherein the temperature in step (f) is about 75° to about 85° C.

5. The process according to claim 1 further comprising the step of:
    blending the acidified whey protein concentrate with milk fat in a weight ratio of about 60:40 to about 100:0.

6. The process according to claim 1 further comprising the step of:
    blending the functional whey protein concentrate with milk fat in a weight ratio of about 60:40 to about 100:0.

* * * * *

UNITED STATES PATENT AND TRADEMARK OFFICE
CERTIFICATE OF CORRECTION

PATENT NO. : 8,349,379 B2
APPLICATION NO. : 11/719571
DATED : January 8, 2013
INVENTOR(S) : Alan Wolfschoon-Pombo et al.

It is certified that error appears in the above-identified patent and that said Letters Patent is hereby corrected as shown below:

Title Page, Item (75) Inventors, line 3, delete "Scheyem" and insert --Scheyern-- therefor.

In the Specifications:

Column 7, line 13, delete "750°" and insert --75°-- therefor.

Signed and Sealed this
Fourth Day of June, 2013

Teresa Stanek Rea
*Acting Director of the United States Patent and Trademark Office*